(12) United States Patent
Mercier et al.

(10) Patent No.: US 11,627,049 B2
(45) Date of Patent: Apr. 11, 2023

(54) FAILSAFE FIRMWARE UPGRADE FOR CLOUD-MANAGED DEVICES

(71) Applicant: HEWLETT PACKARD ENTERPRISE DEVELOPMENT LP, Houston, TX (US)

(72) Inventors: Mathieu Mercier, Laval (CA); Robert Gagnon, St. Laurent (CA); Stephane Laroche, St. Laurent (CA); Jon Green, Aldie, VA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 83 days.

(21) Appl. No.: 16/264,593

(22) Filed: Jan. 31, 2019

(65) Prior Publication Data

US 2020/0252292 A1 Aug. 6, 2020

(51) Int. Cl.
*H04L 12/24* (2006.01)
*H04L 29/08* (2006.01)
(Continued)

(52) U.S. Cl.
CPC .......... *H04L 41/12* (2013.01); *H04L 41/0813* (2013.01); *H04L 41/0866* (2013.01);
(Continued)

(58) Field of Classification Search
CPC ..... H04L 41/12; H04L 41/0866; H04L 67/34; H04L 67/10; H04L 41/0813; H04L 63/08
(Continued)

(56) References Cited

U.S. PATENT DOCUMENTS 6,789,111 B1 * 9/2004 Brockway ............. H04L 69/329
710/72
7,886,031 B1 * 2/2011 Taylor .................. H04L 41/0873
709/224

(Continued)

FOREIGN PATENT DOCUMENTS

CA 2885220 A1 * 3/2014 ......... H04L 63/0428
CA 2942619 A1 * 9/2014 ............... G06F 8/66
(Continued)

OTHER PUBLICATIONS

Device Management Update—ARM, (Web Page), Retrieved Oct. 19, 2018, 1 Pg., https://www.arm.com/products/iot/pelion-iot-platform/device-management/update >.

(Continued)

*Primary Examiner* — David R Lazaro
*Assistant Examiner* — Berhanu Shitayewoldetadik
(74) *Attorney, Agent, or Firm* — McDermott Will & Emery

(57) ABSTRACT

A method of authenticating a device management system of a cloud-managed network includes transmitting a first transmission signal, from an access point, to a secondary port of the device management system. The first transmission signal comprises a first request of the access point to connect to the cloud-managed network. When the access point is incompatible with the cloud-managed network, the access point receives a re-direction instruction from the device management system to redirect the access point to a predefined Internet address to provide compatibility data for the access point. The method further includes that in response to receiving the compatibility data, transmitting a second transmission signal to the secondary port that includes a second request to connect to the cloud-managed network. The method include that in response to authentication by the access point, receiving an instruction from the secondary port to connect via a primary port to the cloud-managed network.

19 Claims, 8 Drawing Sheets

(51) Int. Cl.
| | |
|---|---|
| *H04L 29/06* | (2006.01) |
| *H04L 15/16* | (2006.01) |
| *G06F 15/16* | (2006.01) |
| *H04L 29/12* | (2006.01) |
| *H04L 41/12* | (2022.01) |
| *H04L 67/10* | (2022.01) |
| *H04L 41/0813* | (2022.01) |
| *H04L 9/40* | (2022.01) |
| *H04L 41/0866* | (2022.01) |
| *H04L 67/00* | (2022.01) |

(52) U.S. Cl.
CPC .............. *H04L 63/08* (2013.01); *H04L 67/10* (2013.01); *H04L 67/34* (2013.01)

(58) Field of Classification Search
USPC ........................................................ 709/221
See application file for complete search history.

(56) References Cited

U.S. PATENT DOCUMENTS

| | | | |
|---|---|---|---|
| 9,015,694 B2 | 4/2015 | Gray et al. | |
| 9,106,538 B1* | 8/2015 | Asnis ................ | H04L 43/0876 |
| 10,050,934 B2* | 8/2018 | Singleton, IV ....... | H04L 67/563 |
| 10,057,243 B1 | 8/2018 | Kumar et al. | |
| 10,454,884 B2* | 10/2019 | Toda .................. | H04L 61/5069 |
| 2002/0046299 A1* | 4/2002 | Lefeber ................. | H04L 67/55 |
| | | | 719/318 |
| 2002/0103943 A1* | 8/2002 | Lo ........................... | H04L 41/12 |
| | | | 710/2 |
| 2005/0125489 A1* | 6/2005 | Hanes ....................... | G06F 8/60 |
| | | | 717/173 |
| 2005/0245272 A1* | 11/2005 | Spaur ..................... | H04L 12/66 |
| | | | 455/414.1 |
| 2006/0031436 A1* | 2/2006 | Sakata ................... | H04L 12/14 |
| | | | 709/221 |
| 2006/0112297 A1* | 5/2006 | Davidson ............ | G06F 11/2005 |
| | | | 714/E11.076 |
| 2007/0124797 A1* | 5/2007 | Gupta .................... | H04L 67/02 |
| | | | 726/1 |
| 2007/0288613 A1* | 12/2007 | Sudame .............. | H04L 61/5014 |
| | | | 709/250 |
| 2008/0127165 A1* | 5/2008 | Mullis ....................... | G06F 8/65 |
| | | | 717/173 |
| 2008/0219184 A1* | 9/2008 | Fowler ................ | H04L 43/0811 |
| | | | 370/254 |
| 2010/0077471 A1* | 3/2010 | Schleiss ............. | G05B 19/0428 |
| | | | 726/13 |
| 2011/0161672 A1* | 6/2011 | Martinez ................ | H04L 63/08 |
| | | | 713/168 |
| 2011/0313922 A1* | 12/2011 | Ben Ayed ............... | H04W 4/80 |
| | | | 705/42 |
| 2012/0036220 A1* | 2/2012 | Dare ....................... | H04L 67/01 |
| | | | 709/217 |
| 2012/0290724 A1* | 11/2012 | Noro .................. | H04L 61/4511 |
| | | | 709/225 |
| 2013/0007437 A1* | 1/2013 | Shroni ...................... | G06F 8/65 |
| | | | 713/2 |
| 2013/0013907 A1* | 1/2013 | Marino ................. | G06F 21/305 |
| | | | 713/2 |
| 2013/0097337 A1* | 4/2013 | Chien ................. | H04L 41/0886 |
| | | | 709/250 |
| 2013/0190032 A1* | 7/2013 | Li .......................... | H04L 67/56 |
| | | | 455/517 |
| 2014/0380055 A1* | 12/2014 | Blanchard ............. | H04L 9/3247 |
| | | | 713/171 |
| 2015/0131484 A1* | 5/2015 | Aldrin ................. | H04L 41/5058 |
| | | | 370/254 |
| 2015/0229685 A1* | 8/2015 | Brebion ................ | H04L 65/102 |
| | | | 709/202 |
| 2016/0021028 A1* | 1/2016 | Koide ..................... | H04L 49/15 |
| | | | 370/400 |
| 2016/0028640 A1* | 1/2016 | Zhang ................... | H04L 67/561 |
| | | | 370/389 |
| 2016/0072924 A1* | 3/2016 | Jaber ....................... | H04L 67/10 |
| | | | 709/203 |
| 2016/0077867 A1* | 3/2016 | Falco .................... | G06F 9/3009 |
| | | | 718/101 |
| 2016/0094454 A1* | 3/2016 | Jain ..................... | H04L 41/0895 |
| | | | 370/235 |
| 2016/0134599 A1* | 5/2016 | Ross .................... | H04L 63/0815 |
| | | | 713/168 |
| 2016/0308709 A1* | 10/2016 | Fernandez-Palacios Gimenez ..... | |
| | | | H04L 12/6418 |
| 2017/0004015 A1* | 1/2017 | Raja ........................ | G06F 9/5083 |
| 2017/0034124 A1* | 2/2017 | Toda .................... | H04L 12/1886 |
| 2017/0034127 A1* | 2/2017 | Singleton, IV ..... | H04L 61/2503 |
| 2017/0093625 A1* | 3/2017 | Pera ...................... | H04W 12/088 |
| 2017/0295146 A1* | 10/2017 | Le Buhan ........... | H04L 63/0435 |
| 2017/0317974 A1* | 11/2017 | Masurekar ............ | H04L 67/561 |
| 2018/0013798 A1* | 1/2018 | Pallas ................. | H04L 12/4641 |
| 2018/0052677 A1* | 2/2018 | Lodeiro ................. | G06F 8/654 |
| 2018/0082088 A1* | 3/2018 | Sehmer ............. | G06K 7/10821 |
| 2018/0159943 A1* | 6/2018 | Poon ....................... | H04L 67/51 |
| 2018/0302239 A1* | 10/2018 | Ying ...................... | H04L 41/28 |
| 2019/0007527 A1* | 1/2019 | Kölhi .................... | H04L 67/145 |
| 2019/0036819 A1* | 1/2019 | Kancherla ........... | G06F 9/45533 |
| 2019/0116153 A1* | 4/2019 | Deverakonda Venkata ................ | |
| | | | H04L 63/0823 |
| 2019/0158460 A1* | 5/2019 | Dawes .................... | H04L 67/10 |
| 2019/0158539 A1* | 5/2019 | Hankins ................. | H04L 67/56 |
| 2019/0187972 A1* | 6/2019 | Hirose ...................... | G06F 8/65 |
| 2019/0220602 A1* | 7/2019 | Ruan ..................... | G06F 21/64 |
| 2019/0245830 A1* | 8/2019 | Ratnasingham .... | H04L 63/0254 |
| 2019/0312775 A1* | 10/2019 | Patil .................... | H04L 41/0859 |
| 2020/0007388 A1* | 1/2020 | Johnston ............... | H04L 41/083 |
| 2020/0064797 A1* | 2/2020 | Hannon ................. | H04L 67/34 |
| 2020/0112517 A1* | 4/2020 | Mena ................ | H04L 43/0829 |
| 2020/0151335 A1* | 5/2020 | Ayoub ................. | H04W 12/03 |
| 2020/0162318 A1* | 5/2020 | Patil ...................... | G06F 9/4416 |
| 2020/0177444 A1* | 6/2020 | Nelson-Gal ............. | H04L 67/56 |
| 2020/0186437 A1* | 6/2020 | Shahabudeen ...... | H04L 43/0811 |
| 2021/0044579 A1* | 2/2021 | Nelson-Gal ......... | H04L 41/0859 |
| 2021/0218710 A1* | 7/2021 | Fallah ................. | H04L 63/0876 |
| 2022/0027300 A1* | 1/2022 | Yu ........................ | G06F 9/4411 |

FOREIGN PATENT DOCUMENTS

| | | | | |
|---|---|---|---|---|
| CN | 111541768 B | * | 5/2021 | ........... G06F 21/121 |
| CN | 113452550 A | * | 9/2021 | |
| WO | WO-2013000936 A1 | * | 1/2013 | ......... H04L 12/2898 |
| WO | WO-2018029608 | | 2/2018 | |

OTHER PUBLICATIONS

Device Onboarding and Connection Options, (Web Page), Retrieved Oct. 19, 2018, 6 Pgs., https://cloud.mbed.com/docs/v1.3/connecting/device-onboarding.html.

Securing IoT Devices and Gateways, (Web Page), Retrieved Oct. 19, 2018, 28 Pgs., https://www.ibm.com/developerworks/library/iot-trs-secure-iot-solutions1/index.html.

SmartThings—Security Guidelines, (Web Page), Retrieved Oct. 19, 2018, 7 Pgs., https://smartthings.developer.samsung.com/develop/certification/security.html.

* cited by examiner

FAILSAFE FIRMWARE UPGRADE FOR CLOUD-MANAGED DEVICES

BACKGROUND

A conventional cloud-managed network may include one or more network controllers. Each network controller of the cloud-managed network is coupled to one or more access points such that the access points may connect and communicate to the cloud-managed network through the network controllers. Additionally, the access points are cloud-managed via the network controller. Each access point is coupled to one or more client devices such that the client devices may connect and communicate to the cloud-managed network through the access points and via the network controllers.

Access points of the cloud-managed network may support a firmware upgrade triggered by a cloud-managed network to implement new features and stay compatible with the rest of the cloud-managed network software. A firmware upgrade may happen through regular management processes when an access point is already authorized and is connected to the cloud-managed network. However, a problem may exist when the access point is turned on after a long period of being turned off, such that a firmware of the access point is not compatible with the software of the rest of the cloud-managed network. Thus, the firmware of the access point may need an update before being able to connect to the cloud-managed network.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

Figure 1:
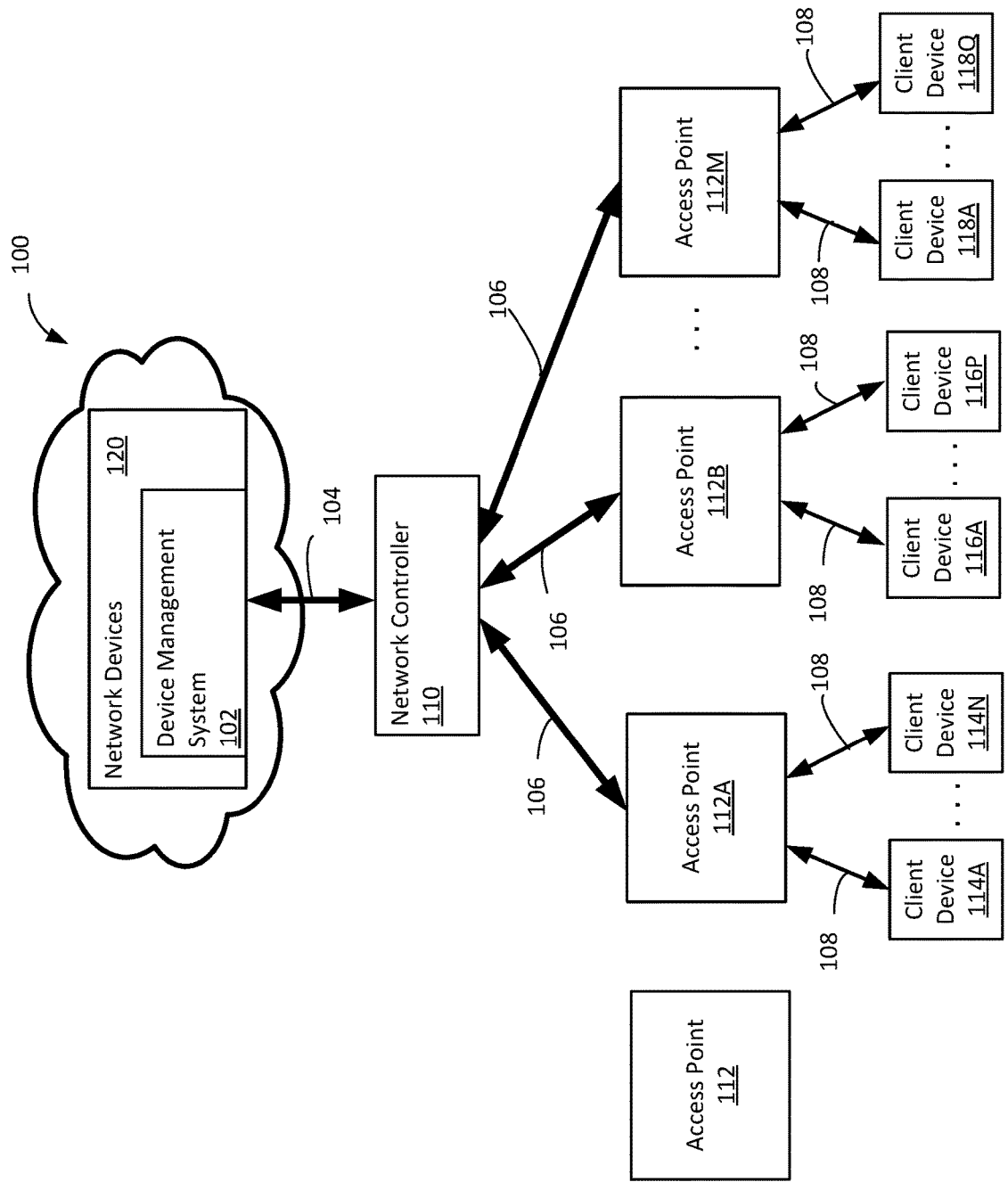
FIG. 1 illustrates a schematic diagram of an exemplary cloud-managed network, according to some aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, an exemplary authentication system for authenticating a device management system of a cloud-managed network by an access point is discussed. The cloud-managed network may include a device management system associated with the cloud-managed network. The device management system may be used as an interface for connecting and communicating with the cloud-managed network. The cloud-managed network may also include one or more access points, e.g., cloud-managed access points. The access points may be authorized by the device management system and thus may connect and communicate with the device management system. The access points may communicate with the device management system via a primary port, e.g., a gateway, of the device management system. In addition, an access point may authenticate the device management system before connecting to the cloud-managed network. In some examples, one or more client devices are coupled to each one of the access points for connecting and communicating with the cloud-managed network.

In some examples, a client, e.g., an administrator of the customer account, may introduce an un-provisioned access point, e.g., a new access point, to be connected to the customer account on the cloud-managed network through the device management system. The un-provisioned access point may authenticate the device management system of the cloud-managed network before connecting to the cloud-managed network. Thus, a new access point is an un-provisioned access point until the new access point is at least once connected to the cloud-managed network and associated with a customer account.

In some examples, the client may introduce a previously connected access point to be re-connected to the customer account on the cloud-managed network through the device management system. The previously connected access point may have been turned off for a period of time such that the firmware of the access point and/or the security credentials of the access point are outdated. Having outdated firmware version and security credentials, the un-provisioned access point may not authenticate the device management system and thus may not authenticate the cloud-managed network. Before being able to re-connect to the cloud-managed network, the previously connected access point that was turned off for a long period of time, e.g., for more than a year, may need a firmware upgrade.

In some embodiments, when an un-provisioned access point turns on for the first time, it does not have the required security credentials to authenticate the cloud-managed network and to connect to the cloud-managed network. Also, when the previously connected access point turns on after a while, it may not have an updated security credentials to be able to authenticate the cloud-managed network via the primary port. In some embodiments, the previously connected access point that fails to authenticate the cloud-managed network via the primary port, initiates communication with the secondary port of the device management system. In some examples, the un-provisioned access point, which has turned on for the first time, does not communicate with the primary port to be connected to the customer account, and initiates communication with the secondary port of the device management system. In some embodiments, the access point initiates communication with the secondary port to authenticate the cloud-managed network via the secondary port of the device management system.

In some embodiments, when the un-provisioned access point communicates with a device management system through the secondary port, the un-provisioned access point may not have the security credentials to authenticate the cloud-managed network. Thus, the un-provisioned access point is directed to an Internet address, e.g., a website designated by the device management system. At the Internet address, the un-provisioned access point may upgrade/update firmware and security credentials that may be included in firmware upgrade. After the update, the access point may authenticate the device management system at the secondary port. After authentication at the secondary port, e.g., an onboarding port, the un-provisioned access point may receive an instruction from the secondary port of the device management system to connect through the primary port. After authenticating at the primary port, the un-provisioned access point may be connected to the cloud-managed network. In some examples, other devices such as network devices, e.g., Ethernet switches, routers, or household and kitchen items may connect to the customer account of the cloud-managed network.

According to various aspects of the subject technology, a method of authenticating a device management system of a cloud-managed network by a device is described. The method includes receiving a first transmission signal, via a secondary port of a device management system of a cloud-managed network from the device. The first transmission signal comprises a first request of the device to connect to the cloud-managed network. The method also includes that in response to determining the device is incompatible with the cloud-managed network, re-directing the device to a predefined Internet address to provide compatibility data for the device. The method further includes receiving a second transmission signal after the re-directing, via the secondary port, from the device. The second transmission signal comprises a second request to connect to the cloud-managed network. The method includes in response to authentication of the device management system by the device, instructing the device to connect via a primary port of the device management system to the cloud-managed network.

According to various aspects of the subject technology, a method of authenticating a device management system of a cloud-managed network by an access point is described. The method includes transmitting a first transmission signal, from an access point, to a secondary port of a cloud-managed network. The first transmission signal comprises a first request of the access point to connect to the cloud-managed network. The method also includes that in response to the access point being incompatible with the cloud-managed network, receiving a re-direction instruction from the cloud-managed network to redirect the access point to a predefined Internet address to provide compatibility data for the access point. The method further includes that in response to receiving the compatibility data, transmitting a second transmission signal, to the secondary port, from the access point. The second transmission signal comprises a second request to connect to the cloud-managed network. The method include that in response to authorization of the cloud-managed network by the access point, receiving an instruction from the secondary port to connect via a primary port to the cloud-managed network.

According to various aspects of the subject technology, a non-transitory machine-readable storage medium encoded with instructions executable by at least one processor of a device management system of a cloud-managed network, the machine-readable storage medium includes instructions to receive a first transmission signal, via a secondary port of the device management system, from an access point. The first transmission signal comprises a first request of the access point to connect to the cloud-managed network via the device management system. The machine-readable storage medium also includes instructions that in response to determining the access point is incompatible with the cloud-managed network, re-directs the access point to a predefined Internet address to retrieve the firmware upgrade that includes updated security credentials for the access point. The machine-readable storage medium further includes instructions to receive a second transmission signal after the re-directing, via the secondary port of the device management system, from the access point. The second transmission signal comprises a second request to connect to the cloud-managed network. The machine-readable storage medium further includes instructions that in response to authentication of the device management system by the access point, instruct the access point to connect via a primary port of the device management system to the cloud-managed network.

FIG. 1 illustrates a schematic diagram of an exemplary cloud-managed network 100, according to some aspects of the disclosure. Cloud-managed network 100 includes cloud network devices 120 that includes device management system 102. Cloud-managed network 100 further includes network controller 110 and access points 112A, 112B, to 112M. The access points 112A, 112B, to 112M, are connected to device management system 102 via communication links 106, network controller 110, and communication link 104. Communication links 106 and 104 may include one or more communication channels. The access points 112A, 112B, to 112M, may communicate with device management system 102 and may send and receive signals that include data, commands, and requests. In some embodiments, each access point 112A, 112B, to 112M, may communicate with one or more client devices. In some examples, access point 112A communicates with client devices 114A to 114N, access point 112B communicates with client devices 116A to 116P, and access point 112M communicates with client devices 118A to 118Q. In some embodiments, client devices 114A to 114N, 116A to 116P, and 118A to 118Q are connected to the respective access point 112A, 112B, to 112M via communication links 108, which may include one or more communication channels. In some examples, access points 112A, 112B, to 112M have authenticated device management system 102 and then are connected to cloud-managed network 100. In some examples, access points 112A, 112B, to 112M, are authorized to become associated with a customer account in cloud-managed network 100.

As shown in FIG. 1, access point 112 may be introduced to be re-connected to the customer account of cloud-managed network 100. In some examples, access point 112 has been turned off for such a time period that the firmware of access point 112 is incompatible with the software of cloud-managed network 100. Thus, access point 112 may need to have a firmware upgrade to be able to authenticate device management system 102 to connect to cloud-managed network 100. In some examples, after startup, if access point 112 uses a channel of a communication link, e.g., communication link 106, to connect to the cloud-managed network 100, the connection may be rejected by device management system 102.

In some embodiments, a process of re-connecting access point 112, e.g., a cloud-managed access point, to a customer account of cloud-managed network 100 is made simple. The process of re-connecting access point 112 to the customer account of cloud-managed network 100 may use a separate port from primary port 201 and is described with respect to FIGS. 5-7.

Figure 2:
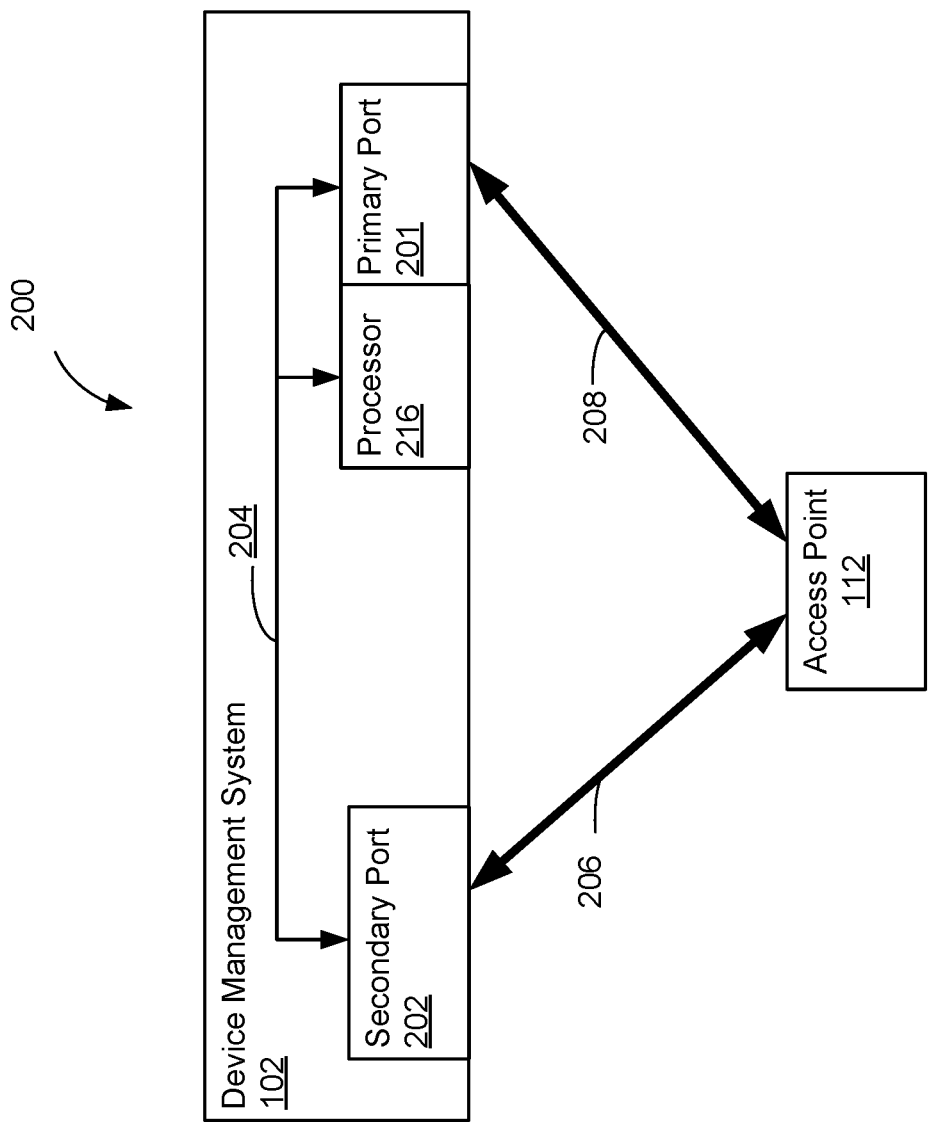
FIG. 2 illustrates a schematic diagram of an exemplary authentication system, according to some aspects of the disclosure.

FIG. 2 illustrates a schematic diagram of an exemplary authentication system 200, according to some aspects of the disclosure. Authentication system 200 includes device management system 102 of FIG. 1, which includes primary port 201 and secondary port 202. In some embodiments, device management system 102 further includes processor 216 that controls primary port 201 and secondary port 202. Processor 216 may communicate to primary port 201 and secondary port 202 through communication link 204. Authentication system 200 also includes communication links 206 and 208 that access point 112 may use for communicating to secondary port 202 and primary port 201 respectively. Although not shown in FIG. 2, communication links 206 and 208 may pass through network controller 110 (shown in FIG. 1). In some examples, access point 112 is not yet connected to cloud-managed network 100, and thus access point 112 is an un-provisioned access point. Initially, the un-provisioned access point 112 may communicate via one or more channels of communication link 206 to secondary port 202 of device management system 102 to authenticate device management system 102 and to be able to receive an instruction from secondary port 202 to connect to cloud-managed network 100 via primary port 201. Then, the un-provisioned access point 112 may communicate via one or more channels of communication link 208 to primary port 201 of device management system 102 to get connected to cloud-managed network 100. In some examples, access point 112 has, at least once, connected to cloud-managed network 100, and thus access point 112 is not an un-provisioned access point. Access point 112, which is not an un-provisioned access point, may initiate communication via one or more channels of communication link 208 to primary port 201 but may fail to authenticate device management system 102 via the primary port 201 of device management system 102. After the failure, access point 112 may initiate communication via one or more channels of communication link 206 with secondary port 202 to authenticate device management system 102 via secondary port 202 of device management system 102. The communication between access point 112 and secondary port 202 of device management system 102 is described with respect to FIGS. 3 and 4. In some examples, primary port 201 and secondary port 202 are the same port and the communications described below with respect to the primary port 201 and secondary port 202 are performed with a single port of device management system 102.

Figure 3:
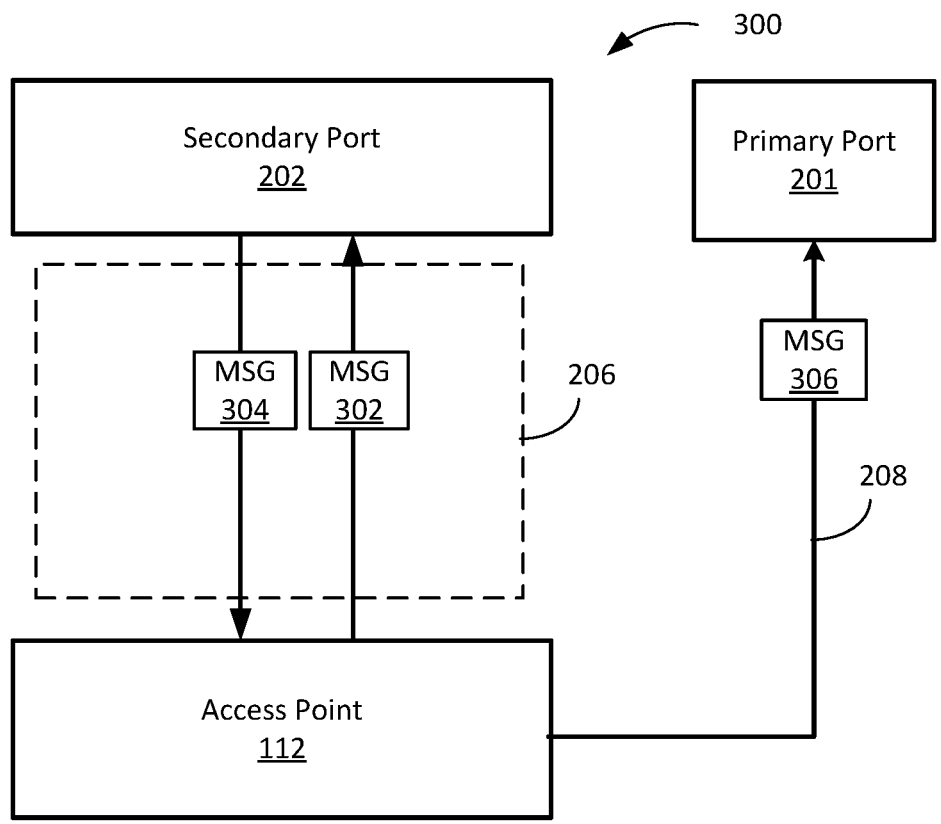
FIG. 3 illustrates a schematic diagram of an exemplary authentication system, according to some aspects of the disclosure.

FIG. 3 illustrates a schematic diagram of an exemplary authentication system 300, according to some aspects of the disclosure. Authentication system 300 is a portion of authentication system 200 that shows access point 112, which is coupled through communication link 206 to secondary port 202 of device management system 102. As noted, access point 112 may not be an un-provisioned access point. Thus, access point 112 may initiate communicating, via communication link 208, to primary port 201 of device management system 102, to get connected to the customer account of cloud-managed network 100. Access point 112 may fail to authenticate device management system 102 via primary port 201 and thus may fail to connect to cloud-managed network 100. Thus, access point 112 may then communicate through secondary port 202 of device management system 102. In some embodiments, a processor of access point 112 (not shown) and a processor of device management system 102, e.g., processor 216, control and synchronize communication links 208 and 206. As shown in FIG. 1, access points, e.g., access point 112, may communicate via network controller 110 with device management system 102. Thus, each one of the communication links 208 and 206 may comprise communication links 106 and 104 of FIG. 1 that pass through network controller 110.

In some examples, access point 112, which is not yet connected to cloud-managed network 100, is an un-provisioned access point. Access point 112 may be a new access point after a first turn on that is not yet connected to a network and by default initially connects to secondary port 202, which is an onboarding port to authenticate device management system 102 via secondary port 202. After authenticating device management system 102, the un-provisioned access point 112 may receive an instruction from device management system 102 of cloud-manage network 100 to connect to cloud-managed network 100 via primary port 201.

In some embodiments, access point 112 sends, e.g., initiates, a transmission signal that includes message 302 to secondary port 202 of device management system 102. Message 302 may be sent via communication link 206 and may include a request for connection to cloud-managed network 100. Message 302 may be sent after access point 112 transmits a request for authentication to secondary port 202 of device management system 102. The request for authentication is described with respect to message 402 of FIG. 4. Message 302 may be sent after access point 112 authenticates device management system 102 via secondary port 202 and may include identifying information of access point 112 and may include a request for connection to cloud-managed network 100.

In some embodiments, authentication has two folds. Access point 112 may provide security credentials of access point 112 at secondary port 202 of device management system 102 such that device management system 102 may authenticate access point 112. Conversely, access point 112 may use the security credentials of access point 112 to authenticate device management system 102 and to verify, e.g., validate, that device management system 102 may be trusted. Thus, before establishing communication between access point 112 and secondary port 202 of device management system 102, access point 112 authenticates device management system 102 and vice versa. After the two-fold authentications, access point 112 and device management system 102 may communicate through communication link 206 and via secondary port 202 and access point 112 may receive an instruction from device management system 102 to connect to cloud-managed network via primary port 201.

In response to receiving message 302, secondary port 202 may transmit message 304 to access point 112. Message 304 may be sent via communication link 206 and may include an instruction from device management system 102. In some examples, a first instruction from device management system 102 may instruct access point 112 to retry connection, e.g., resend message 302, after a time interval, e.g., after 1 second to 10 seconds. In some examples, a second instruction from device management system 102 may instruct access point 112 to connect to primary port 201 of device management system 102 of cloud-managed network 100 via communication link 208. In some embodiments, since message 302 is sent after access point 112 authenticates device management system 102 via secondary port 202, access point 112 may trust device management system 102 and may accept the instruction in message 304.

In some embodiments, after receiving the instruction from secondary port 202 of device management system 102, access point 112 sends message 306 via communication link 208 to primary port 201. In some embodiments, access point 112 authenticates device management system 102 via primary port 201 and then transmits message 306. Message 306 may include identifying information of access point 112 and may request connection to cloud-managed network 100. Authentication system 300 is further described with respect to FIG. 5A.

Figure 4:
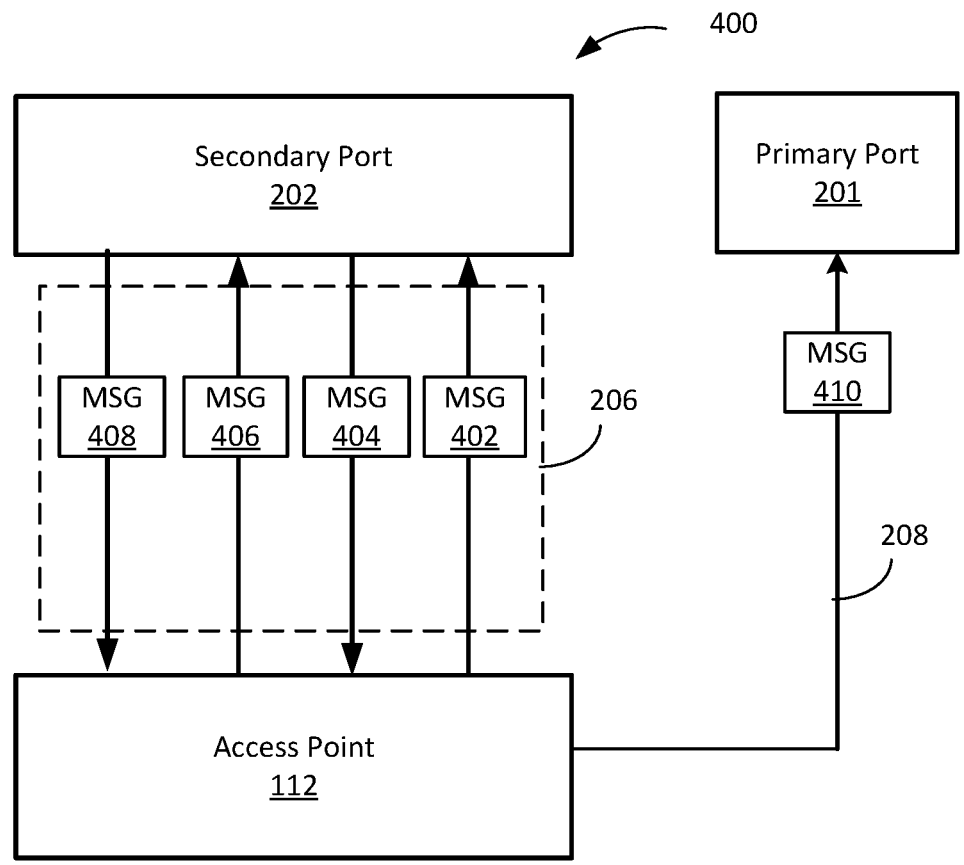
FIG. 4 illustrates a schematic diagram of an exemplary authentication system, according to some aspects of the disclosure.

FIG. 4 illustrates a schematic diagram of an exemplary authentication system 400, according to some aspects of the disclosure. Authentication system 400 is a portion of authentication system 200 that shows access point 112, which is coupled through communication link 206 to secondary port 202 of device management system 102. As noted, access point 112 may be an un-provisioned access point, which is not yet connected to cloud-managed network 100. Thus, access point 112 may be a new access point that at first may have an outdated firmware version and security credentials. In some examples, access point 112 is turned on after a period of being turned off and has failed connecting to cloud-managed network 100 via primary port 201.

In some embodiments, access point 112 sends, e.g., initiates, a transmission signal that includes message 402 to secondary port 202 of device management system 102. Message 402 may be sent via communication link 206 and may include a request for authentication to secondary port 202 of cloud-managed network 100. As discussed above, access point 112 may accept the instructions from device management system 102 after authenticating device management system 102. Since the firmware version and security credentials of access point 112 are outdated, access point 112 may not authenticate device management system 102. In some examples, after failing to authenticate device management system 102, access point 112 may accept a specific command. In response to message 402 and failing to authenticate device management system 102 of cloud-managed network 100 via secondary port 202, device management system 102 may transmit a transmission signal that includes message 404 that includes the specific command of instructing access point 112 to receive a firmware upgrade and updated security credentials. In some embodiments, message 402 and message 404 are transmitted at transport layer security (TLS). Message 402 may include information about firmware version of access point 112. Device management system 102 may determine that the firmware version of access point 112 is outdated, e.g., by comparing the firmware version with a firmware version stored in device management system 102. Thus, device management system 102 may transmit message 404 that includes the specific command for upgrading the firmware. In some examples, device management system 102 determines that the firmware version of access point 112 is not outdated and thus access point 112 may authenticate device management system 102. Thus, device management system 102 may transmit message 404 that includes an instruction other than upgrading the firmware.

In some examples, message 404 instructs access point 112 to re-directs to an Internet address to receive the firmware upgrade and updated security credentials. In some examples, a firmware upgrade includes updated security credentials. In some embodiments, since the firmware upgrade is performed without authenticating device management system 102, access point 112 receives a signed firmware upgrade image from the Internet address. In addition, access point 112 may verify a signature of the signed firmware upgrade image before upgrading. In some embodiments, when upgrading the firmware without authenticating device management system 102, access point 112 validates the upgrade such that the firmware may be upgraded to a newer firmware version. The firmware may not be upgraded to an older firmware version or a firmware version with known bugs or deficiencies.

In some embodiments, access point 112 includes a valid firmware version and security credentials such that access point 112 may authenticate device management system 102 at secondary port 202. Thus, after authenticating device management system 102 by access point 112, access point 112 may receive and accept one or more instructions in one for more transmission signals from device management system 102. In some examples, after authenticating device management system 102, access point 112 may receive an updated version of the firmware and security credentials and an instructions to upgrade the firmware and access point 112 may perform the upgrade instruction.

In some embodiments, after receiving message 404 from secondary port 202 and after updating firmware and/or security credentials, access point sends message 406 to secondary port 202. Message 406 may include a request for connection to the cloud-managed network 100. In response to receiving message 406, secondary port 202 may transmit message 408 to access point 112. Sending message 406 is consistent with sending message 302 of FIG. 3 and receiving message 408 is consistent with receiving message 304 of FIG. 3.

Message 408 may be sent via communication link 206 and may include an instruction from device management system 102. In some examples, the instruction from device management system 102 may instruct access point 112 to retry connection. In some examples, the instruction from device management system 102 may instruct access point 112 to connect to primary port 201 of device management system 102 via communication link 208.

In some embodiments, after receiving the second instruction from secondary port 202 of from device management system 102, access point 112 sends message 410 via communication link 208 to primary port 201. Message 410 may include security credentials of access point 112 and may be used by device management system 102 to authorize the connection of access point 112 via primary port 201 to cloud-managed network 100. Authentication system 400 is further described with respect to FIGS. 5B, 5C, and 5D.

FIGS. 5A-5D illustrate flow diagrams of exemplary processes 500, 530, 550, and 570 for authenticating device management system 102 and connecting access point 112 to cloud-managed network 100, according to some aspects of the disclosure. Processes 500, 530, 550, and 570 may be implemented by authentication system 200 of FIG. 2. Notably, one or more steps of processes 500, 530, 550, and 570 described herein may be omitted, performed in a different sequence, and/or combined with other processes for various types of applications contemplated herein. Processes 500, 530, 550, and 570 may use authentication system 200 for connecting an un-provisioned access point, e.g., access point 112, to a customer account on cloud-managed network 100 where the account may be stored on cloud network device 120.

Figure 5A:
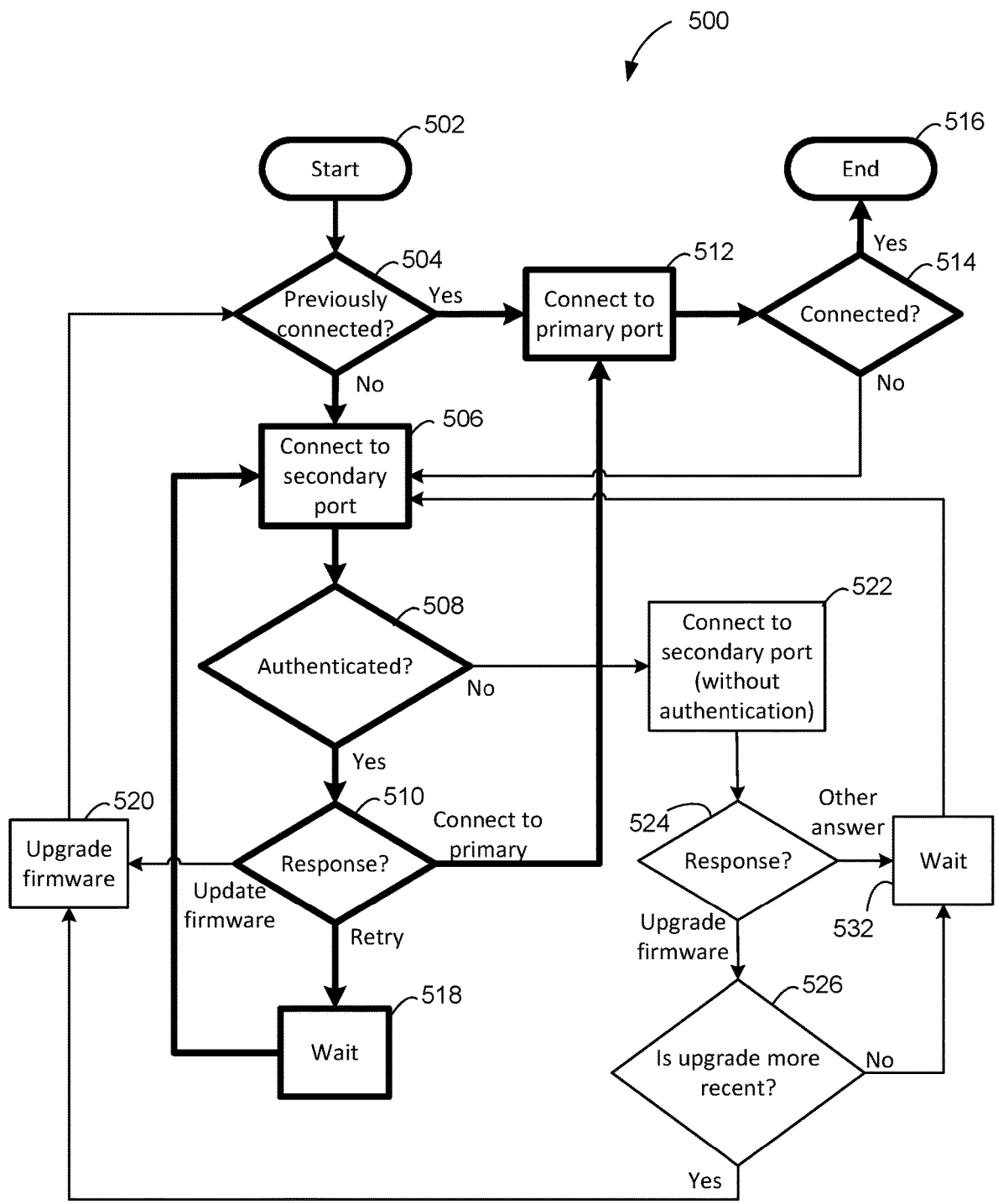
FIGS. 5A-5D illustrate flow diagrams of exemplary processes for authenticating a cloud-managed network and connecting an access point to the cloud-managed network, according to some aspects of the disclosure.

In some examples, as shown in process 500 of FIG. 5A, access point 112 is turned on for the first time and thus access point 112 may not be known to cloud-managed network 100, however, access point 112 includes a valid firmware version and valid security credentials. Alternatively, access point 112 may have already been connected to cloud-managed network 100 and has been part of cloud-managed network 100, however, has been turned off for a short period between few seconds to few hours. Thus, access point 112 includes a valid firmware version and valid security credentials.

Process 500 starts at step 502 and then goes to step 504. At step 504, access point 112 may determine if access point 112 has previously been connected to cloud-managed network 100. When the answer is yes, process 500 goes to step 512 and access point 112 may initiate to connect to the primary port 201 of cloud-managed network 100. In some examples, access point 112 sends a message, e.g., message 306 of FIG. 3, and attempts to connect to primary port 201 of device management system 102 of cloud-managed network 100. Then, process 500 goes to step 514 and determines if access point 112 is successfully connected to primary port 201 of device management system 102. If the answer is yes, process 500 ends at step 516. A failure of connecting to primary port 201 of device management system 102 is described with respect to FIG. 5C.

Process 500 goes to step 506 when the answer at step 504 is no. At step 506 access point 112 may send a message to secondary port 202 of device management system 102 and may initiate a connection via secondary port 202 to device management system 102 of cloud-managed network 100. Step 506 is consistent with sending message 302 of FIG. 3 and may be transmitted after access point 112 authenticates device management system 102 via secondary port 202. Message 302 may include identifying information of access point 112 and may include a request for connection to cloud-managed network 100.

Then, process 500 goes from step 506 to step 508. At step 508, access point 112 verifies that the authentication of device management system 102 via secondary port 202 was successful. If device management system 102 is authenticated, process 500 goes to step 510. In some examples, the authentication of device management system 102 by access point 112 fails. A failure of the authentication of device management system 102 is described with respect to FIG. 5D.

At step 510, access point 112 receives a message from secondary port 202 of device management system 102, which is consistent with receiving message 304 of FIG. 3. Message 304 may include one of two instructions that are described in steps 512 and 518.

At step 518, access point 112 is instructed by device management system 102 to wait for a time interval of, e.g., 1 second to 30 seconds, and then re-connect at step 506. In some examples, device management system 102 may use this time interval to allow a customer account administrator to authorize access point 112. Receiving the wait instruction may indicate that the firmware version of access point 112 is also validated and no firmware upgrade may be required.

At step 512, access point 112 is instructed by device management system 102 to connect to cloud-managed network 100 via primary port 201 of device management system 102. Receiving the connect instruction may indicate that the firmware version of access point 112 is also validated. In some examples, the instruction to connect to cloud-managed network 100 via primary port 201 is received by access point 112 subsequent to the instruction to wait for the time interval.

Figure 5B:
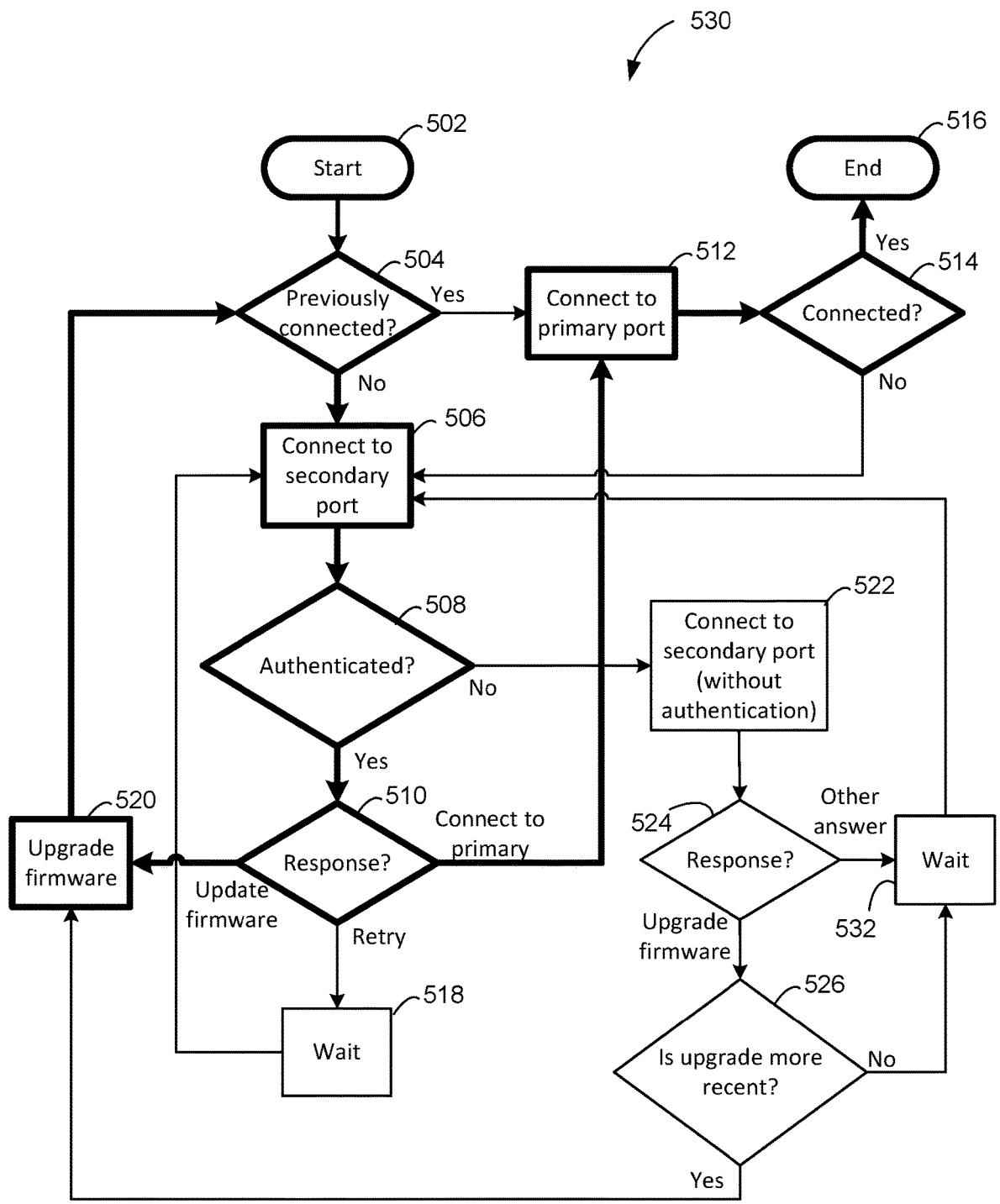

In some examples, as shown in process 530 of FIG. 5B, access point 112 is turned on for the first time and thus access point 112 may not be known to cloud-managed network 100, however, access point 112 includes valid security credentials but does not include a valid firmware version.

Process 530 starts at step 502 and then goes to step 504. At step 504, access point 112 may determine if access point 112 has previously been connected to cloud-managed network 100.

Process 530 goes to step 506 when the answer at step 504 is no. At step 506 access point 112 may send a message to secondary port 202 of device management system 102 and may initiate a request for connection via secondary port 202 to device management system 102 of cloud-managed network 100. As described, the request for connection that is consistent with sending message 302 and may precede with a request for authentication to via secondary port 202 of device management system 102. The request for authentication is described with respect to message 402 of FIG. 4

Then, process 530 goes from step 506 to step 508. At step 508, access point 112 verifies that the authentication of device management system 102 via secondary port 202 was successful. If device management system 102 is authenticated, process 530 goes to step 510. In some examples, the authentication of device management system 102 by access point 112 fails. A failure of the authentication of device management system 102 is described with respect to FIG. 5D.

At step 510, access point 112 receives a message from secondary port 202 of device management system 102, which is consistent with receiving message 304 of FIG. 3. Message 304 may include one of two instructions that are described in steps 512 and 520.

At step 512, access point 112 is instructed by device management system 102 to connect to cloud-managed network 100 via primary port 201 of device management system 102. Receiving the connect instruction may indicate that the firmware version of access point 112 is also validated.

At step 520, access point 112 is instructed by device management system 102 to perform a firmware upgrade and then repeat the process at step 504. In some examples, secondary port 202 of device management system 102 re-directs access point 112 to an Internet address to receive the firmware upgrade and possibly receive updated security credentials.

Figure 5C:
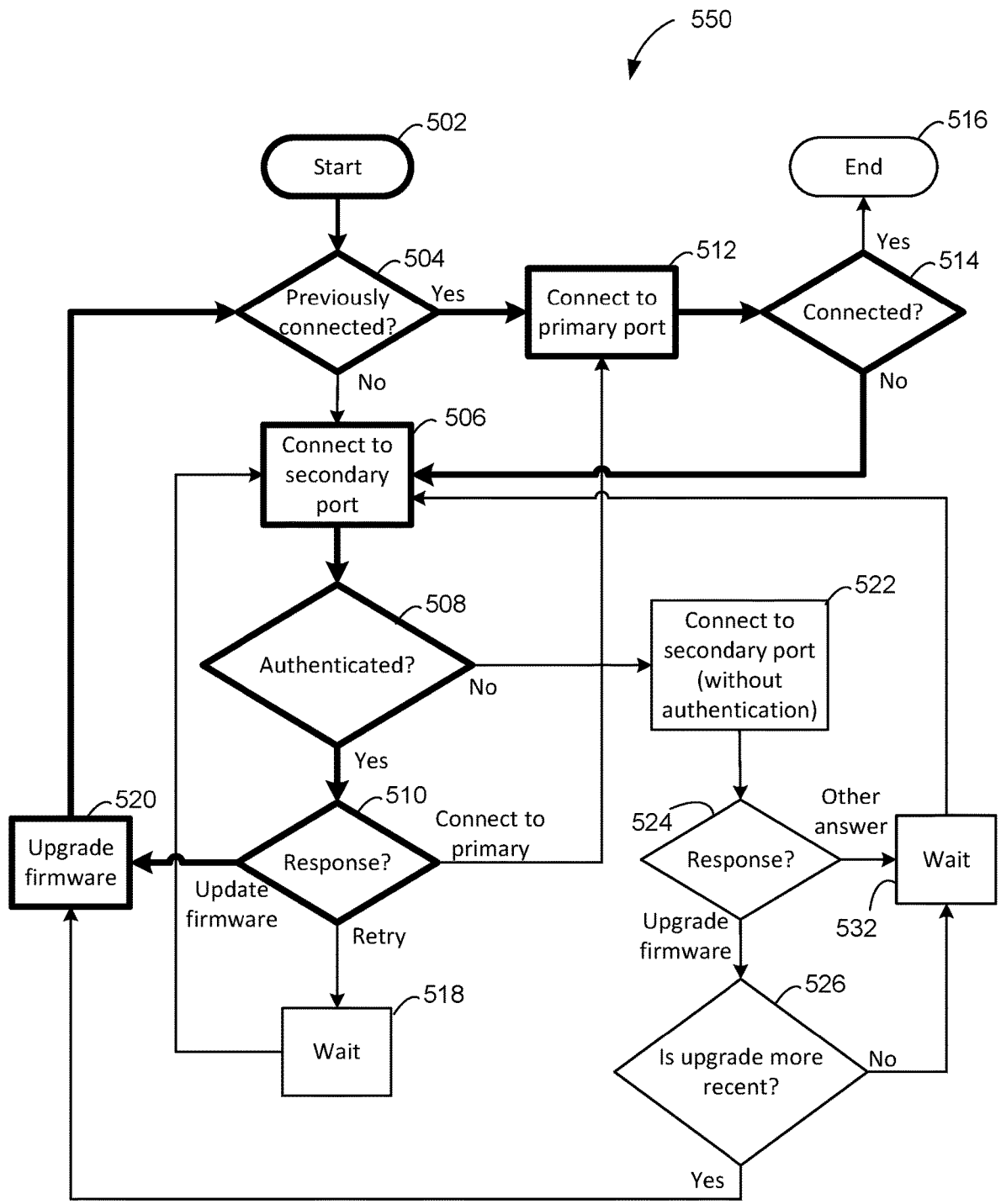

In some examples, as shown in process 550 of FIG. 5C, access point 112 may have already been connected to cloud-managed network 100 and has been part of cloud-managed network 100. However, access point 112 has been turned off for a long period, e.g., more than a year. Thus, access point 112 includes valid security credentials but may not include a valid firmware version.

Process 550 starts at step 502 and then goes to step 504. At step 504, access point 112 may determine if access point 112 has previously been connected to cloud-managed network 100. When the answer is yes, process 550 goes to step 512 and access point 112 may initiate to connect to the primary port 201 of cloud-managed network 100. Then, process 550 goes to step 514 and determines if access point 112 is successfully connected to primary port 201 of device management system 102. If the answer is yes, process 550 ends at step 516. However, if answer is no, process 550 goes to step 506.

At step 506 access point 112 may send a message to secondary port 202 of device management system 102 and may initiate a connection via secondary port 202 to device management system 102 of cloud-managed network 100. As described, the request for connection that is consistent with sending message 302 may precede with a request for authentication to secondary port 202 of device management system 102.

Then, process 550 goes from step 506 to step 508. At step 508, access point 112 verifies that the authentication of device management system 102 via secondary port 202 was successful. Access point 112 further verifies that the authentication was successful. If device management system 102 is authenticated, process 550 goes to step 510. A failure of the authentication of device management system 102 is described with respect to FIG. 5D.

At step 510, access point 112 receives a message from secondary port 202 of device management system 102, which is consistent with receiving message 304 of FIG. 3. Message 304 may include an instruction that is described in steps 520.

At step 520, access point 112 is instructed by device management system 102 to perform a firmware upgrade and then repeat the process at step 504. In some examples, secondary port 202 of device management system 102 re-directs access point 112 to an Internet address to receive the firmware upgrade and possibly receive updated security credentials.

In some embodiments, access point 112 authenticates device management system 102, based on security credentials of access point 112, at secondary port 202, however, access point 112 may not authenticate device management system 102 at the primary port 201. Thus, in some examples, after authenticating device management system 102 at secondary port 202, secondary port 202 may re-direct access point 112 to the Internet address to upgrade the firmware of access point 112.

Figure 5D:
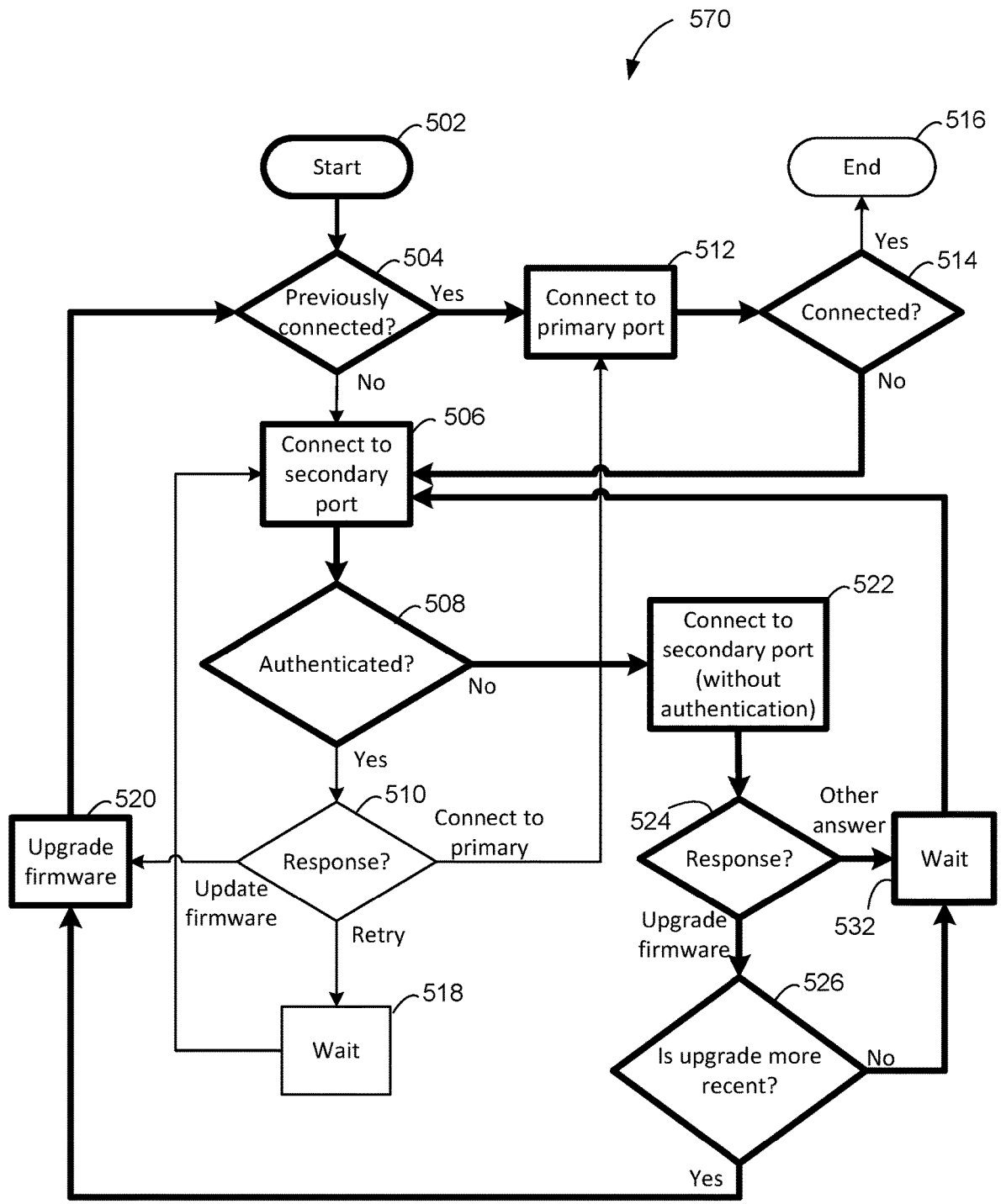

In some examples, as shown in process 570 of FIG. 5D, access point 112 may have already been connected to cloud-managed network 100 and has been part of cloud-managed network 100. However, access point 112 has been turned off for a long period of a year or more. Thus, access point 112 may not include valid security credentials and may not include a valid firmware version.

Process 570 starts at step 502 and then goes to step 504. At step 504, access point 112 may determine if access point 112 has previously been connected to cloud-managed network 100. When the answer is yes, process 570 goes to step 512 and access point 112 may initiate to connect to the primary port 201 of cloud-managed network 100. Then, process 570 goes to step 514 and determines if access point 112 is successfully connected to primary port 201 of device management system 102. If the answer is yes, process 570 ends at step 516. However, if answer is no, process 570 goes to step 506.

At step 506 access point 112 may send a message to secondary port 202 of device management system 102 and may initiate a connection via secondary port 202 to device management system 102 of cloud-managed network 100. Step 506 is consistent with sending message 302 of FIG. 3 and may precede with a request for authentication to secondary port 202 of device management system 102.

Then, process 570 goes from step 506 to step 508. At step 508, access point 112 verifies that the authentication of device management system 102 via secondary port 202 was successful. If device management system 102 is not authenticated, process 570 goes to step 522.

At step 522 access point 112 may initiate a connection via secondary port 202 to device management system 102 of cloud-managed network 100, however, the connection is without authenticating device management system 102. Thus, access point 112 may not accept an instruction from device management system 102 except an instruction to upgrade the firmware version and security credentials.

At step 524, access point 112 receives a message from secondary port 202 of device management system 102. The message may include an instruction for access point 112. If the instruction is to upgrade the firmware, process 570 goes to step 526. However, access point 112 receives any other instruction beside upgrading the firmware, process 570 goes to step 532 and waits for a time interval, e.g., between 1 second and 10 hours, and then repeats the process at step 506.

At step 526, access point 112 determines if the firmware upgrade to perform has a more recent version that an existing firmware executing on access point 112. If the answer is yes, process 570 goes to step 520. In some embodiments, if the answer is no, access point 112 may not accept a firmware downgrade and thus goes to step 532 and waits for a time interval between 1 second and 30 seconds and then repeats the process at step 506.

At step 520, access point 112 is instructed by device management system 102 to perform a firmware upgrade and then repeat the process at step 504. In some examples, secondary port 202 of device management system 102 re-directs access point 112 to an Internet address to receive the firmware upgrade and receive updated security credentials.

Figure 6:
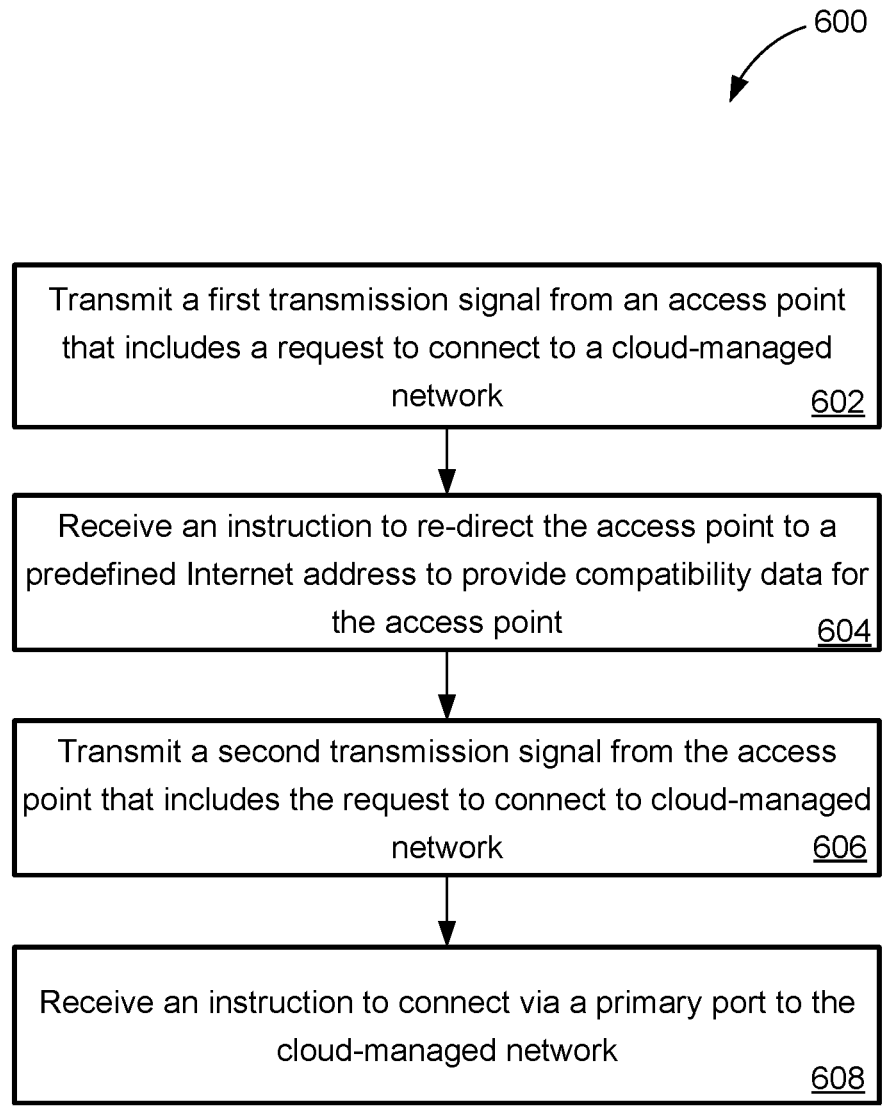
FIG. 6 illustrates a flow diagram of an exemplary process for authenticating a cloud-managed network, according to some aspects of the disclosure.

FIG. 6 illustrates a flow diagram of exemplary process 600 for authenticating device management system 102 of cloud-managed network 100 by access point 112 using the example authentication system of FIG. 2, according to some aspects of the disclosure. In some examples, authentication system 200 may be used for implementing process 600. Notably, one or more steps of process 600 described herein may be omitted, performed in a different sequence, and/or combined with other processes for various types of applications contemplated herein. In some examples, a client of cloud-managed network 100 has an account on the cloud-managed network. As shown in FIG. 1, the client may have a number of access points 112A, 112B, to 112M that are already connected to the cloud-managed network 100. Process 600 may use authentication system 200 for connecting an un-provisioned access point, e.g., access point 112, to a customer account on cloud-managed network 100 where the account may be stored on one or more cloud network devices 120. In some examples, access point 112 may be turned off for a long period of time and thus the firmware running on access point 112 may not be compatible with the rest of cloud-managed network 100. Thus, the firmware of access point 112 may need an update before being able to connect to cloud-managed network 100. In some examples, in the long period of time that access point 112 was turned off, a new certificate authority may be used by cloud-managed network 100, and thus security credentials of access point 112 may also need an update.

Process 600 begins at step 602, where a first transmission signal is transmitted by access point 112 that includes a request to connect to a cloud-managed network 100. As shown in FIG. 2, the first transmission signal is received by device management system 102 through secondary port 202 and via communication link 206. In some examples, device management system 102 includes two ports. Primary port 201 is a default port for provisioned access points to communicate with cloud-managed network 100. In some examples, a client re-introduces an access point, e.g., access point 112, that has been turned off for a long period of time, to cloud-managed network 100. In some examples, the re-introduced access point authenticates device management system 102 and is also authenticated by device management system 102 before being authorized to connect to a customer account on cloud-managed network 100. If the re-introduced access point 112 tries to connect through primary port 201, access point 112 may fail to authenticate device management system 102 via primary port 201. Thus, the connection may be rejected and the new access point 112 may initiate a connection through secondary port 202, e.g., an onboarding port. Then, the re-introduced access point 112 may start sending the first transmission signal that may include a request of connection, e.g., re-connection of access point 112, to cloud-managed network 100. In some embodiments, access point 112 introduces some identifying information of access point 112 to device management system 102. Based on the identifying information of access point 112 that is received through secondary port 202, device management system 102 may identify that access point 112 is not connected to cloud-managed network 100 and thus may identify access point 112 as an access point that tries to connect to cloud-managed network 100. In some examples, the identifying information of access point 112 includes a firmware version of access point 112 and security credentials of access point 112.

In step 604, access point 112 receives an instruction to re-direct access point 112 to an Internet address. The Internet address provides compatibility data for access point 112. In some embodiments, when it is determined that access point 112 is incompatible with the cloud-managed network 100, access point 112 is directed, e.g., re-directed, to an Internet address, e.g., an Internet website. When access point 112 is incompatible with secondary port 202 of cloud-managed network 100, access point 112 is re-directed, by secondary port 202 of device management system 102, to an Internet address. At the Internet address, access point 112 may receive compatibility data that includes an update of the firmware to a more recent version and receiving updated security credentials.

In some embodiments, access point 112 is incompatible with secondary port 202 of cloud-managed network 100, because access point 112 cannot authenticate device management system 102. As described, when access point 112 fails to authenticate device management system 102, access point 112 may accept one specific instruction from secondary port 202 of device management system 102. As described, the one specific instruction may consist of upgrading the firmware version and the security credentials. In some examples, an access point, e.g., access point 112, that is re-introduced, initially tries to connect through primary port 201. When access point 112 fails the authentication device management system 102 at primary port 201, access point 112 may initiate connecting to secondary port 202 to receive compatibility data. The process of receiving the compatibility data is described with respect to FIGS. 4, 5C and 5D.

In step 606, a second transmission signal is transmitted from access point 112 that includes the request to connect to a cloud-managed network 100. As shown in FIG. 2, the second transmission signal is received by device management system 102 through secondary port 202 and via communication link 206. The second transmission signal is received when access point 112 has received the compatibility data and firmware version and/or the security credentials are updated. Thus, after the update, access point 112 may authenticate device management system 102 at secondary port 202 device management system 102. After authenticating device management system 102, access point 112 may receive and execute an instruction from device management system 102.

In step 608, access point 112 receives an instruction to connect via primary port 201 to cloud-managed network 100. As noted above, re-directing from secondary port 202 may occur after access point 112 successfully authenticates device management system 102 at secondary port 202. Then, device management system 102 or secondary port 202 instructs access point 112 to re-directs to primary port 201. In some embodiments, at primary port 201, access point 112 connects to cloud-managed network and becomes associated with the customer account on the cloud-managed network 100.

In some embodiments, when access point 112 does not include valid security credentials to authenticate device management system 102 at secondary port 202 and is re-directed to the Internet address, the only command that access point 112 accepts is the command to upgrade. By connecting to the Internet address through secondary port 202, access point 112 may only upgrade the firmware. The restriction of upgrading to a more recent firmware is added to prevent a secondary port 202 that may be malicious to downgrade the firmware of access point 112 to introduce an older version with known security issues.

In some embodiments, the firmware images, e.g., firmware upgrade images, are signed and verified by access point 112 before installing. Access point 112 may validate a signature of the firmware image to verify that the firmware image is created by a trusted party. In some embodiments, the firmware image is signed by a private key of the trusted party and access point 112 may verify the signed firmware image by using a corresponding public key of the private key. In some examples, access point 112 may accept an upgrade to a more recent firmware version. Access point 112 may accept other commands such as re-directing to primary port 201 after device management system 102 is authenticated by access point 112. In some examples, the security credentials are part of the firmware upgrade image.

In some embodiments, a new access point, e.g., access point 112 that has not been connected to cloud-managed network 100, may only attempt to connect through secondary port 202. Access point 112 may be incompatible with cloud-managed network 100 when tries to connect to secondary port 202. Thus, when a newly manufactured access points attempt to connect through secondary port 202, access point 112 may fail. In addition, access point 112 may try to authenticate device management system 102 and if successful, access point may determine that access point 112 is compatible with cloud-managed network 100.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations, or processes disclosed is an illustration of exemplary approaches. Based upon design preferences, it is understood that the specific order or hierarchy of steps, operations, or processes may be rearranged. Some of the steps, operations, or processes may be performed simultaneously. Some or all of the steps, operations, or processes may be performed automatically, without the intervention of a user. The accompanying method claims, if any, present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (0 unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method comprising:
   receiving a first transmission signal, via a secondary port of a device management system of a cloud-managed network, from a device, wherein the first transmission signal comprises a first request of the device to connect to the cloud-managed network and an indication of whether a firmware of the device is outdated, and wherein the indication of whether the firmware of the device is outdated comprises a firmware version of the device;
   determining, at the device management system, whether the device is incompatible with the cloud-managed network, wherein the determining comprises comparing the firmware version of the device with a predefined firmware version of the device;
   in response to determining the device is incompatible with the cloud-managed network based on the indication, re-directing the device to a predefined Internet address to provide a firmware upgrade and security credentials for the device;
   receiving, from the device via the secondary port of the device management system, a second transmission signal after the re-directing and upgrading of the firmware of the device, wherein the second transmission signal comprises a second request to connect to the cloud-managed network; and
   in response to authentication of the device management system by the device, instructing, by the device management system, the device to connect via a primary port of the device management system to the cloud-managed network.

2. The method of claim 1, wherein comparing the firmware version of the device with the predefined firmware version of the device determines whether the firmware version of the device is outdated.

3. The method of claim 1, wherein the device being incompatible further comprises that the device lacks updated security credentials for authenticating the device management system.

4. The method of claim 3, wherein determining that the device is incompatible is further based on a failure of the device to authenticate the device management system.

5. The method of claim 3, wherein the device performs the upgrading of the firmware and implements the updated security credentials after validating a firmware upgrade image, wherein the upgrading of the firmware of the device upgrades, using the firmware upgrade image to a version newer than an existing version of the firmware of the device.

6. The method of claim 3, further comprising:
   connecting the device via the primary port to the cloud-managed network.

7. The method of claim 1, wherein re-directing the device to the predefined Internet address comprises sending a message from the secondary port to the device.

8. The method of claim 1, wherein the device is one of an access point, a router, or an Ethernet switch.

9. The method of claim 1, wherein instructing the device to connect via the primary port to the cloud-managed network is in response to authentication of the device management system by the device at the secondary port.

10. The method of claim 1, further comprising:
receiving, at the device management system from the device, the security credentials obtained by the device from the predefined Internet address; and
authorizing, by the device management system using the security credentials, a connection of the device via the primary port of the device management system.

11. The method of claim 1, wherein the primary port is separate from the secondary port.

12. A method comprising:
transmitting, from an access point, a first transmission signal to a secondary port of a device management system of a cloud-managed network, wherein the first transmission signal comprises a first request of the access point to connect to the cloud-managed network and an indication whether a firmware of the access point is outdated, and wherein the indication of whether the firmware of the access point is outdated comprises a firmware version of the access point;
in response to the access point being incompatible with the cloud-managed network based on a determination at the device management system that comprises comparing the firmware version of the access point with a predefined firmware version of the access point, receiving, at the access point, a re-direction instruction from the cloud-managed network to redirect the access point to a predefined Internet address to obtain a firmware upgrade and security credentials for the access point;
in response to performing the firmware upgrade of the access point, transmitting, from the access point to the secondary port of the device management system, a second transmission signal that comprises a second request to connect to the cloud-managed network; and
in response to authentication of the device management system by the access point based on the firmware upgrade and security credentials, receiving, at the access point, an instruction from the secondary port to connect via a primary port of the device management system, wherein the primary port is separate from the secondary port.

13. The method of claim 12, wherein comparing the firmware version of the access point with the predefined firmware version of the access point determines whether the firmware version of the access point is outdated.

14. The method of claim 12, wherein the re-direction instruction is from the secondary port of the device management system.

15. The method of claim 12, wherein determining that the access point is incompatible is further based on a failure of the access point to authenticate the device management system.

16. The method of claim 15, further comprising:
validating the firmware upgrade image before upgrading the firmware at the access point using the firmware upgrade image.

17. A non-transitory machine-readable storage medium comprising instructions that upon execution cause a device management system to:
receive a first transmission signal, via a secondary port of the device management system, from an access point, wherein the first transmission signal comprises a first request of the access point to connect to a cloud-managed network via the device management system and a firmware version of a firmware of the access point;
determining, at the device management system, whether the access point is outdated, wherein the determining comprises comparing the firmware version of the access point with a predefined firmware version of the access point;
in response to determining the access point lacks updated security credentials to connect to the cloud-managed network and determining that the firmware of the access point is outdated by comparing the firmware version of the access point with the predefined firmware version of the access point, re-direct the access point to a predefined Internet address to retrieve the updated security credentials for the access point and a firmware upgrade for the access point;
receive, from the access point via the secondary port of the device management system, a second transmission signal after the re-directing and upgrading of the firmware of the access point, wherein the second transmission signal comprises a second request to connect to the cloud-managed network; and
in response to authentication of the device management system by the access point, instruct the access point to connect via a primary port of the device management system to the cloud-managed network, wherein the primary port is separate from the secondary port.

18. The non-transitory machine-readable storage medium of claim 17, wherein determining that the access point lacks the updated security credentials is based on the access point failing to authenticate the device management system via the secondary port.

19. The non-transitory machine-readable storage medium of claim 17, wherein the access point is re-directed via the secondary port to the predefined Internet address.

* * * * *